Patented Mar. 18, 1952

2,589,941

UNITED STATES PATENT OFFICE 2,589,941

MOLDING COMPOSITIONS FROM CELLULOSE, FORMALDEHYDE, HYDROCARBON, AND ALKALI

Emil Hene, deceased, late of Stamford, Conn., by The Stamford Trust Company, Stamford, Conn.; Else Hene and Derek H. Hene, administrators, assignors to Usewood Corporation, New York, N. Y., a corporation of New York No Drawing. Application August 21, 1951, Serial No. 242,978. In Great Britain January 3, 1947

23 Claims. (Cl. 260—9)

This invention relates to curing and molding compositions and more particularly to those made from sawdust, and to the process for making such compositions. This application is a continuation-in-part of copending application Serial No. 795,138, filed December 31, 1947 and a continuation-in-part of co-pending application Serial No. 165,865 filed June 2, 1950 both of which are now abandoned.

According to the invention a porous cellulose containing material selected from the group consisting of cellulose and cellulose containing particles is treated with an aqueous solution of an alkali, formaldehyde, and a hydrocarbon or hydrocarbons with or without addition of a phenolic substance, the mixture being gently heated and any excess of water removed to form a curing or moulding composition.

The cellulose containing body is preferably wood, e. g. sawdust, wood flour or wood shavings, fine enough to absorb the other reactants. In some cases obnoxious compounds may be present in the cellulose containing body as for instance in some hard wood, such as oak. These should be partly or totally extracted before admixing the other reaction compounds. Other cellulose containing matter such as cotton and paper pulp may be used, especially when a phenolic substance is present. The porosity and amount of the cellulose containing body should suffice to absorb all the other reactants, and it may be soaked successively with the reactants or with a combination of the co-reacting compounds.

Cellulose which has been caused to react with sodium hydroxide or potassium hydroxide beforehand may be used without removing the alkali or after removing part only. The alkali serves as a condensing agent as well as an activator of the cellulose. An advantageous proportion of alkali is from 2 to 10% of the cellulose, in some cases an optimum value occurring around 4 to 6%. In general the proportion of alkaline reactant to be used for activating the cellulose will reduce as the amount of phenolic substance is increased.

For many years developments have been directed toward utilization of the vast quantities of wood waste which are available as a by-product of the lumber industry. One such development has centered on the use of granulated wood or sawdust as a major ingredient in molding compositions, in which the wood is either a filler or one of the reactants. Profitable use of wood waste in either of these manners requires a simple, inexpensive process, wherein large amounts of the cellulosic material are combined with lesser proportions of low-cost chemical reagents, and for this reason molding compositions are not satisfactory which involve several chemical and physical treatments of the wood or which require the use of an expensive resin binder. In fact, a cheap process for a wood molding composition is not available, because those which have been developed require heavy equipment, careful control, expensive reagents, and several steps or stages of operation.

Accordingly, it is a particular object of this invention to utilize wood waste, e. g., sawdust as it comes from the mill. Another object is to provide a chemical process for producing curing and molding compositions from sawdust and a relatively small proportion of other ingredients which are comparatively inexpensive. A further object is to provide a chemical process wherein sawdust is reacted to produce a molding composition which may be molded into any shape and the need is eliminated for a synthesized resin binder or for any digestion or pretreatment of sawdust; in fact any change in the original lignin in the sawdust should be avoided. A still further object is to furnish a simple, inexpensive process for making molding compositions from sawdust, wherein unskilled labor, simple, light and inexpensive equipment and cheap raw materials may be used, and which can be carried out in a short time with a plant requiring very little space. One of the objects also is to provide a chemical process suitable for installation at a sawmill whereby sawdust can be utilized, and another to provide a rapid, low-temperature process for producing molding and curing compositions from sawdust. Additionally one of the objects is to provide a composition from wood which is useful for molding artificial lumber, for molding various shaped articles, and for binding two materials together. It is also an object to provide a composition made from wood which may be cured or molded under relatively mild conditions to temperature and pressure for a relatively short time. These and other objects will be in part apparent and in part pointed out hereinafter.

The invention consists of the various features and steps of the process, combinations of elements, compositions of matter, and relation of the same to one or more of the others, all as will be illustratively described herein, and the scope of the application of which will be indicated in the claims.

According to a particular embodiment of the present invention, a molding powder is produced by reacting and drying, at atmospheric pressure, a mixture of coarse sawdust containing unpolymerized lignin, formaldehyde, a paraffinic hydrocarbon, an alkali selected from the group consisting of sodium or potassium hydroxide, and water with or without the addition of a phenolic substance. The powder thus produced can be used for molding complicated shapes at low pressure, as a resin for binding untreated sawdust or other fillers to make artificial lumber, for a coating or veneer on wood or metal, as a glue for laminated boards and metals, and for a priming coat on wood prior to painting.

With no or only small proportions of phenolic bodies formaldehyde should preferably be present in a large excess with respect to the quantity finally incorporated. This excess can easily be recovered during the drying operation. When phenolic bodies are present in large proportions only a small molecular excess of formaldehyde to phenolic body is required, but a larger excess may be used to achieve a particular desired result. The amount of water regulates the consistency of the initial mixture as well as its homogeneity.

The process comprises generally a simple mixing operation followed by drying the mixture to a desired degree at a comparatively low temperature for a short time. This drying process is of importance and the time, temperature and final reduction of weight require careful regulation as flow decreases with reduction of water and increase of temperature. Usually the temperature should be below 212° F., preferably below 185° F., e. g. between 122° F. and 176° F. Hot air may be passed through the mixture and vacuum may be applied. The curing depends on the nature of the powder, but generally at temperature between 293° F. and 347° F. and a pressure of between 0.3 and 3 tons per square inch will be effective but these figures do not represent either a minimum or maximum for the possible values.

The many experiments conducted in the development of this process and composition have indicated that certain characteristics or properties are either desirable or necessary to acquire satisfactory powders. Generally the following observations have been made in regard to each ingredient.

Sawdust is an important raw material, and green sawdust as it comes from the mill is preferred because it is believed that one of the reactions involved in the process is between the hydrocarbon and the cellulose-lignin combination. It is believed that unpolymerized lignin is contained in green sawdust and is in all probability essential to this reaction, and observations also indicate that polymerized lignin is not only of no use, but is distinctly detrimental. Therefore, any change in the original lignin, as by chemical or physical treatment, should be avoided as much as possible to keep the unpolymerized form available for reaction.

Certain varieties of wood are superior to others, and in general the most suitable are those having a low percentage of ingredients soluble in cold water (the carbohydrates), a low percentage of hot water solubles (the syrups), and a high proportion of ingredients extractable with organic solvents (the resins). The pines represent the most suitable, and yellow pine has been found particularly ideal, though white pine and other varieties lend themselves to a better color scheme. Hemlock and similar pines contain four or five times the water-soluble constituents of yellow pine, and this proves disadvantageous unless they are removed by washing, in which case excellent results may be achieved. The firs are also useful, e. g., Douglas fir and spruce, especially after carbohydrates and syrups have been extracted. After thorough washing a number of hardwoods may also be used alone or in mixture with softwoods.

Bulk factor is an important consideration in the selection of a sawdust, particularly where the product is to be used in a mold having a low capacity for the material charged therein. Yellow pines have the advantage of a lower bulk factor than most other sawdusts, i. e., a given weight of molding powder produced therefrom occupies a lesser volume.

Most advantageously the major portion of the sawdust should be in the range of 10 to 40 mesh, and due to dense structure it is often advisable to crush it while wet (i. e. containing 30–40% moisture) as in a hammer mill, to cause slight defibrination without affecting the lignin. Coarser sawdust may be used, though at a loss of fineness of grain structure in the final product, while wood pulp and very fine material, such as wood flour, are not satisfactory. While it is very difficult and expensive to crush sawdust to a comparatively fine powder, this is not so with this curing powder which can be crushed economically. Products having very homogeneous, smooth surfaces therefore can easily be obtained by crushing curing powder made from a coarse sawdust and using this for molding either as such or mixed with uncrushed powder of a uniform size obtainable by sieving. If this uncrushed powder has a higher moisture content than the crushed powder, a highly satisfactory blend may be had which produces articles with smooth surfaces while molding at low pressure with a short curing time. Accordingly it is possible to select optimum conditions for efficient molding of a satisfactory product.

Another constituent requiring care in selection is the hydrocarbon which is usually employed to the extent of 10% to 35% of the weight of sawdust, depending upon the nature of the sawdust and the properties desired in the final powder, e.g., less hydrocarbons need be used with woods containing a high proportion of rosin, and more hydrocarbons are required for boards than for molded shapes. In any case, the hydrocarbon should be liquid at the temperature of the reaction, should have a high flash point so that there is little if any evaporation during the first stages of curing, it should not tend to polymerize; no appreciable proportion should be soluble in liquid sulfur dioxide or in sulfuric acid, and the surface tension should be high.

The hydrocarbon is an inexpensive item and may be derived from any source such as petroleum, asphalt, shale, tars, bituminous sands, and liquefaction of coal, provided that they or the mixtures containing them are liquid at the conditions of the reaction and their vapour pressure low enough for there to be little or no evaporation during the operation. They may be paraffinic, naphthenic or aromatic hydrocarbons either saturated or unsaturated or mixtures of any of these. This use of any hydrocarbon is in distinction from any previous processes for absorbing hydrocarbons in a moulding powder and the proportion of hydrocarbon which can be used is also greatly in excess of that used in any previous process for absorbing hydrocarbons in a molding powder. Hydrocarbons with high paraffinicity (high aniline point) and of a boiling range above 680° F., as to the bulk, are to be preferred however. Hydrocarbons obtained from a jelly containing crude oil are especially suitable. Fractions from paraffinic crudes boiling between 500° and 800° F. fulfill the above enumerated properties, and in general, those with highest paraffinicity are preferred. Apparently the presence of some naphthenic hydrocarbons is not harmful, however, and a moderate amount of aromatics is beneficial when phenol is not used in the process and the rosin content of the wood is on the high side, i. e., 6–7%. Nevertheless, when phenol is added in excess of 2% of the weight of sawdust, the advantage of aromatic hydrocarbons in the hydrocarbon mixture appears to be eliminated.

Tests indicate that hydrocarbons of the type here used penetrate the lignin of the wood and dilute it, thereby reducing the bond (believed to be a surface tension phenomenon) between cellulose and lignin without polymerization of the latter. However, the effect of hydrocarbon is more far-reaching since a large amount is employed and very little is pressed out of the powder on molding. It is not a mere plasticizer, though, because separation cannot be effected by pressing or by solvent extraction, and substitution of known plasticizers will not produce the desired resinous composition.

The remaining constituents, formaldehyde, alkali, and a phenolic substance, are commercial grades commonly employed and require no alteration. Formaldehyde can be added in any form and is used in abundance because the excess passes off during drying and may be recovered. A commercial aqueous solution, known as "formalin," is convenient, and the proportion added should be 8% to 12% (calculated as HCHO) of the weight of sawdust.

The phenolic substance is selected from the group consisting of phenol, cresol and xylenol and mixtures of any of these. With their increase in proportion the properties of the final product as to strength, gloss and water resistance improve considerably. The proportion to be added to produce these improvements in properties is considerably lower than that necessary with normal phenolformaldehyde moulding powders.

Alkali serves as an activator of cellulose, and may in addition act as a condensing agent. It is conveniently added during the process as a 30% aqueous solution. Sodium and potassium hydroxides are the only two of commercial importance, and they appear to be the most satisfactory ones. 2% to 8% of the weight of sawdust (calculated as KOH) can be used, though 3½% is the normal requirement. With sodium hydroxide, the product is generally more brittle than one made with potassium hydroxide, so whenever a relatively large amount of rosin is present in the wood (which increases brittleness), or when the powder is to be used for molding complicated shapes, potassium hydroxide is preferable despite its higher cost.

Free water should be present in the mixture in an amount sufficient for homogeneous distribution throughout the sawdust of the water-soluble constituents. Usually some is needed in addition to that which accompanies the formaldehyde and alkali solutions, but the addition should be controlled to avoid formation of a paste.

A phenolic substance is not essential to a molding composition according to this invention, but its use in small amounts enhances the physical properties of the molded product and improves appearance to an wholly unexpected extent. If used, optimum results are achieved with 4% to 8% of the weight of sawdust, and though higher proportions produce more shiny and stronger articles, these advantages must be weighed against the cost of adding more of this expensive compound.

Apparently the action of a hydrocarbon containing some phenol on lignin is far superior to that of the hydrocarbon alone, and by conducting the process at a temperature below that at which phenol and formaldehyde condense, substantially all the added phenol is available for this function. It is believed that phenol favors entry of hydrocarbon and alkali into cellulose without polymerization of lignin.

The process of this invention essentially involves proportioning the various ingredients, and then gently agitating and heating them in a closed mixer for about one and one-half hours at a temperature slightly below 130° F., during which time most of the reaction is complete. Then warm air is blown over the mixture for about one hour to remove excessive moisture and formaldehyde. Generally about a 20% reduction in weight is desirable. The product thereby obtained is granular in form, resembling the original sawdust, and may be used as a powder for molding shapes, as a coating for boards and metal surfaces, as a binder to which filler may be added for pressing boards, etc.

The present process is particularly unique in utilizing a relatively high percentage of waste sawdust mixed with only a small quantity of chemicals which are not particularly expensive to produce a moldable plastic without digestion of the wood or need for expensive equipment. It is believed to be based on the use of unpolymerized lignin without the presence of polymerized lignin, and coarse, green sawdust seems to be the best form of wood for this purpose. Low mixing and drying temperatures avoid side reactions, and the curing conditions are especially satisfactory if the pressure during molding is raised gradually.

Curing depends on the nature of the powder, but ordinarily a temperature of 300° to 350° F. and a pressure lower than one-half ton per square inch will be sufficient even for complicated shapes that usually can only be molded at high temperatures and pressures, but higher pressure may be used for powders which contain little moisture and accordingly do not flow readily. In the case of boards, good products can be made under pressure of only 100 to 300 pounds per square inch. Molding time varies from a few seconds for coatings to four to six minutes for molded shapes, and it is advisable to use a positive mold where the powder can be trapped before pressure is applied. The pressure should be raised slowly e. g. within 20 to 40 seconds only about 20% of the final pressure should be applied, and then the final pressure may be approached within about 10 seconds more.

Variations to suit plant practice will of course be made in carrying out the mixing and drying operations, but preliminary treatment of the sawdust is not necessary. Generally the sawdust is used as it comes from the mill, though sieving for purposes of grading may be desirable, and powders from coarse yellow pine sawdust show improvement if crushed to smaller size in a hammer mill, apparently because the mild defibrinating action allows better penetration of liquid reagents into the wood during the reaction period.

One satisfactory procedure is to heat together in a suitable vessel the hydrocarbon and phenol (if used) to a temperature of about 120° F., and then add the alkali solution, the formaldehyde solution, and the proper amount of water. Dye may be added too if tinting of the final product is desired. The sawdust is placed in a ribbon mixer, and then the other preheated constituents are poured over the sawdust. The temperature at this stage is approximately 70° F. The mixer is closed and caused to agitate its contents gently while external heat is applied to elevate the temperature to about 125° F. in half an hour. Heating and gentle agitation is continued for about one and one-half hours while the temperature approaches 130° F., and then drying proceeds by blowing in air preheated to about 110° F. The temperature of the mixture should be allowed to drop to 116°–118° F., and the powder is ready for removal when approximately 20% loss in weight has resulted, which usually is within about one hour from the time warm air is admitted, but may be determined accurately by sampling the product at various stages during drying. The exhaust drying air may be passed through suitable formaldehyde recovery apparatus to effect a further economy. During mixing it is important to maintain the reaction temperature below 130° F. to avoid condensation of phenol and formaldehyde which would increase curing time, but near the end the temperature may be increased after most reaction is complete, to thereby speed the drying operation.

The flow of the powder during molding is dependent in some degree upon its moisture content, for generally reduction in moisture is accompanied by decreased flow; however the appearance is improved with a drier powder. Of further interest is the present finding that it is often necessary to allow freshly prepared powder to set for some time before it molds as desired. The present tests indicate that generally this "setting time" varies directly with the drying period, and it has been found that with long drying periods the powder may have to set for as long as three days before it can be satisfactorily molded. This setting time, nevertheless, can be markedly shortened by reducing the drying period, according to the present experiments. For example, it has been found that if the drying time is reduced to one hour when making a molding powder from yellow pine sawdust, a beaker may be molded one hour after the powder has been removed from the ribbon mixer.

An alternate mixing and drying procedure, and one which has proved advantageous, is to place crushed sawdust and the requisite hydrocarbon in a mixer, heat to about 100° F., and agitate for one-half hour before adding the other constituents. Mixing and drying is continued as before, and the reaction appears to proceed more rapidly and thoroughly.

These and other procedural variations will be evident from the several examples given below. The proportions to be used in a particular case will depend primarily on the type of product being made, though slight modifications are also necessary to adjust for differences in raw materials (principally sawdust and hydrocarbon), and the following examples are typical of the invention but should not be construed as limiting its scope or intent:

*Example 1*

120 gms. sawdust
100 cc. formaldehyde
80 cc. water
65 gms. of a fraction of a paraffinic crude boiling 725°–743° F.
20 cc. sodium hydroxide solution (30% by weight).

These products were mixed for a few minutes and a crumbly paste obtained. It was placed into a drier at about 149°–154.5° F. as a layer of about 3 mm. on a tin; a slow air stream passed through the drier.

After two hours the weight was reduced to 210 gms. by the removal of water and formaldehyde.

The dried product was curved at about 320°–338° F. for three minutes at a pressure of 1 ton per square inch and 147 gms. of pellets of about ⅛ inch thickness obtained.

They were of sufficient strength to prove that the material is useful for many purposes, e. g. as boards, wall covers, etc.

*Example 2*

44 gms. cresol, liquid (about 97%)
88 cc. formalin (38% HCOH)
80 cc. water
65 gms. of a hydrocarbon fraction as used in Example 1.
7 cc. of sodium hydroxide solution (about 30% by weight)
160 gms. sawdust (14% $H_2O$)
0.2 gm. rhodamine dye.

These products were gently mixed for a few minutes and a crumbly mass obtained.

It was put on a tray as a layer of about 3–4 mm. high and placed into a drying oven at about 140° F. for about 75 minutes. The weight of the product was thus reduced to 318 gms. During the drying a slow air stream was passed through the drier and excessive formaldehyde together with water vapours carried away.

The dried product was cured at 330° F. for 3 minutes, the pressure being 1 ton per square inch.

245 gms. of cured pellets of about ⅛ inch thickness were obtained. They were very satisfactory as to flow, appearance, strength and resistance to water.

*Example 3*

60 gms. of phenol
65 gms. of the same type of hydrocarbons as in Example 1.
120 cc. formalin (38% HCOH)
10 cc. sodium hydroxide solution (30% by weight)
120 gms. sawdust.

These were treated as above. The drying temperature was 122°–185° F. and time 90 minutes. The weight of the dried product was 270 gms.

From this 203 gms. pellets of excellent quality were obtained by curing at the same conditions as in Example 2.

The reaction mixture used in this test but without the sawdust, was placed in a beaker: immediately the hydrocarbons formed a top layer. On stirring to effect dispersion and gradually raising the temperature to start reaction a hard resinous mass was formed which was not mouldable. Therefore the absorption in the activated cellulose prevents agglomeration and over-curing and leads to new types of combination.

Example 4

120 gms. sawdust (14% water)
30 gms. of a cut from a paraffinic crude boiling from 725°–743° F.
20 cc. of caustic soda solution (15% by weight)
10 cc. ammonia solution (specific gravity 4.88)
40 cc. formalin (about 38% strength)
20 gms. cresol (97%) and
140 cc. water were mixed in a closed vessel for a short time and heated for 90 minutes from 122°–194° F.

The mass was then placed on a tin as a layer of about 5 mm. thickness and heated for about 70 minutes to 203°–206.5° F.: the weight was then reduced to 180 gms.

Curing was carried out at about 329° F. for three minutes at a pressure of 0.7 tons per square inch to obtain pellet of ⅛ inch thickness. About 145 gms. pellets were obtained which showed excellent properties.

Example 5

Raw materials:

A mixture of various types of coarse sawdust, hemlock, Douglas fir and redwood, passing an eight mesh to the inch sieve.

Crude 97% cresol of a dark colour.

A hydrocarbon fraction boiling between 716°–734° F. obtained by straight distillation of an Anglo-Iranian crude.

33% by weight Formalin solution.
33% by weight sodium hydroxide solution.

22 lbs. of the sawdust were mixed with 11½ lbs. of the crude cresol, 5 lbs. of the hydrocarbons, 11 lbs. of the Formalin and 625 gms. of the sodium hydroxide solution in a Werner mixer for about 30 minutes.

No external heat was applied. The temperature rose from 66° F. during the agitation. The mixture was transferred into a revolving drum of stainless steel, which was heated externally, and through which hot air at 212° F. was blown. The drying operation was carried out for 63 minutes during which the temperature rose to 194° F. Water and some formaldehyde were carried away by the air, the latter being recoverable. About 44 lbs. of curing powder were obtained.

To show the simplicity and low cost of this operation it may be remarked that the whole manufacture of the curing powder could easily be carried out in simple apparatus such as a jacketed tube mill or ball mill.

In order to test the powder it was cured in a mould for tiles with intricate insertions for which an excellent flow was required for a good article. This could be achieved at a temperature between 293° F. and 338° F. with a certain optimum between 307° F. and 316° F.

The powder was filled into the mould without preheating cured for about 3½ minutes at a pressure of one ton per square inch and an excellent article was thus obtained of dimensions 6 inches by 6 inches by ⅓ inches. It was strong, shiny, of good water resistance and hard but not brittle. It could be sawed, drilled, turned, etc., and the cross section showed full fusion. The loss during curing was about 15% by weight. Such a tile could be boiled in water for three hours or more without showing appreciable change of weight or dimensions: in some cases the appearance of the surface was even improved as the colour became lighter.

It was possible to dry the curing powder further e. g. under vacuum and thus reduce the loss during curing.

Example 6

120 gms. sawdust
60 gms. formalin
30 cc. sodium hydroxide
120 gms. creosote

These were mixed and dried for about three hours at 122°–140° F. and for about half an hour at about 176° F. and 142 gms. of cured products obtained.

Example 7

(Showing the superiority of paraffinic hydrocarbons which are used to replace aromatic hydrocarbons removed from the creosote.)

The creosote was shaken with a third of its volume of sodium hydroxide solution (15% by weight) and allowed to settle; the extract was removed and substituted in the remainder of one third of its volume of hydrocarbons.

120 gms. sawdust
185 cc. prepared as above by extracting 200 ccs. creosote with 125 cc. sodium hydroxide solution
50 cc. hydrocarbons as in Example 5
50 cc. formalin The ingredients were mixed and treated as before and 210 gms. of curing powder of improved quality as compared with Example 6 was obtained.

Generally too high a content of sodium hydroxide affects resistance to water and further improved results were obtained by removing 60% of the sodium hydroxide by addition of hydrogen fluoride.

Example 8

10 lbs. bleached cotton were impregnated with a hot mixture 140° F. of 7 lbs. crude cresol (97%) and
5 lbs. of paraffinic hydrocarbon boiling from 572°–707° F. and also with
3 litres formaldehyde (40% by volume) and a solution
150 gms. of sodium hydroxide in 500 cc. water.

The impregnation was carried out in a Werner mixer and the agitation lasted for 1 hour. The temperature rose during this time from 53.5° F. (immediately after impregnation) to 71.5° F.

The mixture was dried in a rotating drum, the temperature rising to 140° F. within half an hour and to 176° F. within a further 20 minutes. The temperature was kept at 176° F. for 20 minutes and during this time air of approximately 176° F. was blown through the drum, which carried away excess formaldehyde and water vapour. It was then allowed to cool down. Approximately 22 lbs. of dry curing powder was thus obtained. Samples taken from the drier at successive intervals showed decreasing flow. The final product obtained by this test showed satisfactory flow at 1 ton per square inch. The final product could be turned, drilled and sawn.

The products are of excellent resistance to cold and boiling water and also to cold and boiling normal butyl alcohol. In some cases an improvement of the surface has been observed by such treatment especially with flat articles obtained from impure raw material and at low temperature and pressure.

Example 9

The following were placed in a closed ribbon mixer:

12.5 lbs. yellow pine sawdust crushed through a 1/16" screen
4.0 lbs. paraffinic hydrocarbon
1 liter formalin (37% formaldehyde)
0.5 lbs. potassium hydroxide (90%) dissolved in 1 liter of water The hydrocarbon used in this example is highly paraffinic as indicated by sulfonation tests with strong sulfuric acid. In such a test 80% will not sulfonate. Specific gravity of the oil is 27° minimum (A. P. I.), flash point on open cup is approximately 365° F., while viscosity runs about 100–120 seconds Saybolt Universal at 100° F. and 40 seconds at 210° F.

The mixture was heated to 120° F. and agitated for three hours at that temperature. Then air at about 120° F. was passed through the mixer for 1½ hours while heating and agitation were continued as before. 20 pounds 3 ounces of dry powder were obtained.

A board was made by pressing a one inch layer of the powder between two metal plates at 320° F. and 20 p. s. i. pressure for one minute, and then increasing the pressure to 225 p. s. i. The total molding time was 10 minutes.

Example 10

The following were placed in a closed ribbon mixer:

12.5 lbs. yellow pine sawdust crushed through a 1/16" screen
3.5 lbs. hydrocarbon as used in Example 9
1.7 liters formalin (37% formaldehyde)
0.5 lbs. potassium hydroxide (90%) dissolved in 1.3 liters of water The mixture was heated to 120° F. and agitated for 1¾ hours at that temperature. Then air at about 120° F. was passed through the mixer for 2½ hours while heating and agitation were continued as before. The yield was 19 pounds of dry powder.

A perfectly molded beaker was obtained with this powder in an A. S. T. M. specimen beaker mold using a temperature of 305° F. and total pressure of 3½ tons applied for five minutes.

Example 11

The following were placed in a closed ribbon mixer:

12.5 lbs. yellow pine sawdust crushed through a 1/16" screen
3.5 lbs. hydrocarbon as used in Example 9
1.7 liters formalin (37% formaldehyde)
0.5 lbs. potassium hydroxide (90%) dissolved in 0.8 liters of water.
0.5 lbs. phenol
1 oz. dye dissolved in 0.5 liters of water The mixture was heated and agitated. In about ½ hour the temperature reached 120° F. This temperature was maintained for two hours more, then air heated to 100° F. was blown through the mixer for two hours, excess formaldehyde being washed out of the air in a scrubber. 20 pounds of molding powder were obtained. The powder was allowed to set for some days and was then used to make both a board and a beaker.

A board was made by pressing a one inch layer of the powder between two metal plates at 305° F. and 280 p. s. i. pressure for six minutes.
A beaker was made as in Example 10.

Example 12

The following were placed in a closed ribbon mixer:

9 lb. 6 oz. white pine sawdust crushed in a hammer mill and sieved through an 18 mesh sieve
2 lbs. 4 oz. phenol
1 lb. 6 oz. hydrocarbon used in Example 9
1.7 liters formalin (37% formaldehyde)
6 oz. KOH
560 cc. water
21 gms. of a red dye in 560 cc. water The mixture was agitated and heated for 2¾ hours when a temperature of 130° F. was reached. Then air heated to 100° F. was blown through the mixer for 1½ hours.

15 lbs. 13 oz. of powder were obtained. After setting it was tested as in Example 10 using a total pressure of about four tons for 4 minutes. A fully molded beaker of good plastic appearance was obtained.

The process shows distinct features different from the known process of preparing phenolic curing powders, e. g. curing occurs within a shorter time and so does final thermosetting. Cooling with compressed air is therefore not necessary: almost no tendency of warping of the finished articles is apparent.

The short time and low temperature required and obligatory for a satisfactory product is surprising. During the last stages of drying, there is a fairly steep decrease of flow. By careful control, from the same drier, products can be taken subsequently requiring a pressure for curing from less than ¼ to more than 2 tons per square inch, the total difference of drying periods from the lowest to the highest being less than 30 minutes. This time becomes even shorter when the mixture has been allowed to dry at a lower temperature (around 86° F.) where the bulk of the water readily evaporates. This might indicate that this process does not represent a gradually proceeding condensation as with the known phenol resins but a process of two different stages when curing is included, namely:

(1) The formation of a number of complex bodies of various types, not necessarily all thermosetting resins, combined by associated as a result of surface tension and sufficiently stable to allow of the removal of the greatest part of the water under carefully controlled conditions. The combination seems to be insoluble in water which would account for the ease of the removal of the water.

(2) Curing would represent a fairly sudden disturbance of this equilibrium by heat and pressure perhaps due to the change of water into the vapour phase with excellent flow for a short time and rapid setting. Electronic curing is of great advantage.

The examples are illustrative of the novel features of this invention and show that a moldable composition may be produced by a remarkably simple process utilizing for the most part ingredients which are unusually inexpensive. Sawdust in sizes available in large quantities may compose 70% or more of the molding powder, and with proper selection, no pretreatment is necessary, though for high grade products it may be desirable to sieve or grade the sawdust or crush it to uniform size, and some varieties of sawdust may may require washing to remove undesirable constituents; but none of these preliminary operations seriously interferes with the over-all economies of the process.

The other constituents of the composition are not costly either. Hydrocarbons such as described in Example 1 are in fact only cheap by-products of petroleum refining. Phenol, though somewhat more expensive, is used in small amounts or not at all, depending on the application, and recovery of excess formaldehyde reduces the expense of this ingredient. Only a minor amount of alkali need be used, and so the entire raw material cost is remarkably low.

The operation itself is unusually simple for a chemical reaction of this nature. Instead of high-temperature, steam and pressure equipment for multi-stage operations, one needs use only a simple ribbon mixer having a low temperature heater, and an air-blowing attachment. The time involved is quite short, and the space required to handle the entire set-up is relatively small.

It will thus be seen that the various objects and advantages above set forth as well as many others have been accomplished in a highly practical, economical and satisfactory manner.

Since many possible embodiments may be made of the features of the above invention, and since the examples herein described may be varied in many particulars, it is to be understood that all matters hereinabove set forth or shown in the examples is to be interpreted as illustrative and not in a limiting sense.

What is claimed is:

1. The process of preparing a curing and molding composition which consists essentially of mixing a porous cellulosic material selected from the group consisting of cellulose and cellulose-containing particles with a mixture of water, an alkali hydroxide selected from the group consisting of sodium hydroxide and potassium hydroxide, formaldehyde and a member of the group consisting of a hydrocarbon which is liquid and has a low vapor pressure at the reaction temperature when the composition is cured and a mixture of such a hydrocarbon and a phenolic substance selected from the group consisting of a phenol, cresol, and xylenol, and drying the mixture by gentle heating.

2. The process of preparing a curing and molding composition which consists essentially of mixing a porous cellulosic material selected from the group consisting of cellulose and cellulose-containing particles with a mixture of water, an alkali hydroxide selected from the group consisting of sodium hydroxide and potassium hydroxide, formaldehyde and a paraffinic hydrocarbon which is liquid and has a low vapor pressure at the reaction temperature when the composition is cured, and drying the mixture by gentle heating.

3. The process of preparing a curing and molding composition which comprises mixing a porous cellulosic material selected from the group consisting of cellulose and cellulose-containing particles with a mixture of water, an alkali hydroxide selected from the group consisting of sodium hydroxide and potassium hydroxide, formaldehyde, a phenolic substance selected from the group consisting of phenol, cresol, xylenol, and mixtures of these, and a highly paraffinic hydrocarbon boiling between 500° and 800° F., and drying the mixture by gentle heating.

4. The process of preparing a curing and molding composition which consists essentially of mixing a porous cellulosic material selected from the group consisting of cellulose and cellulose-containing particles with a mixture of water, an alkali hydroxide selected from the group consisting of sodium hydroxide and potassium hydroxide, formaldehyde and a highly paraffinic hydrocarbon the bulk of which boils above 680° F., and drying the mixture by gentle heating.

5. The process of preparing a curing and molding composition which comprises mixing a porous cellulosic material selected from the group consisting of cellulose and cellulose-containing particles with a mixture of water, an alkali hydroxide selected from the group consisting of sodium hydroxide and potassium hydroxide, formaldehyde and a hydrocarbon the bulk of which boils above 680° F., and drying the mixture by gentle heating.

6. The process of preparing a curing and molding composition which consists essentially of mixing a porous cellulosic material selected from the group consisting of cellulose and cellulose-containing particles with a mixture of water, an alkali hydroxide selected from the group consisting of sodium hydroxide and potassium hydroxide, the amount of sodium hydroxide corresponding to from 2% to 10% of the cellulose content of the mixture and the potassium hydroxide being used in an equivalent amount, formaldehyde, and a hydrocarbon, the bulk of which boils above 680° F., and which has a low vapor pressure at the reaction temperature, and drying the mixture by gentle heating.

7. The process of preparing a curing and molding composition by agitating and drying a mixture consisting essentially of sawdust, and a member of the group consisting of a hydrocarbon which is liquid and has a low vapor pressure at the reaction temperature when the composition is cured and a mixture of such a hydrocarbon and a phenolic substance selected from the group consisting of phenol, cresol, and xylenol, formaldehyde, water and an alkali selected from the group consisting of sodium hydroxide and potassium hydroxide, the drying being in the order of 185° F. and therebelow.

8. The process of preparing a curing and molding composition by agitating and drying a mixture consisting essentially of sawdust, a hydrocarbon which is liquid and has a low vapor pressure at the reaction temperature, when the composition is cured, formaldehyde, water, an alkali selected from the group consisting of sodium hydroxide and potassium hydroxide, and a phenolic substance selected from the group consisting of phenol, cresol, and xylenol, the drying being in the order of 185° F. and therebelow.

9. A process of preparing a molding composition which comprises mixing sawdust with a hydrocarbon of high paraffinicity boiling between 500° and 800° F., an excess of formaldehyde, an alkali selected from the group consisting of sodium hydroxide and potassium hydroxide in proportion of 2% to 10% of the weight of sawdust, a phenolic substance selected from the group consisting of phenol, cresol, xylenol, and mixtures of these, and sufficient water for homogeneous distribution of liquid ingredients, and agitating and heating the mixture to a temperature of 185° F. and therebelow until the desired degree of drying takes place.

10. The process of preparing a curing and molding composition which consists essentially of mixing sawdust containing unpolymerized lignin with a mixture of water, a member of a group consisting of a hydrocarbon which is liquid and has a low vapor pressure at the reaction temperature when the composition is cured and a mixture of such a hydrocarbon and a phenolic substance selected from the group consisting of phenol, cresol, and xylenol, formaldehyde and an alkali selected from the group consisting of sodium hydroxide and potassium hydroxide, and drying the mixture at a temperature not higher than 130° F.

11. The process of preparing a molding composition which consists essentially of mixing sawdust containing unpolymerized lignin with from about 10% to about 35% by weight thereof of a hydrocarbon which is liquid and has a low vapor pressure at the reaction temperature when the composition is cured, from about 8% to about 12% by weight of formaldehyde, from about 2% to about 8% by weight of an alkali selected from the group consisting of sodium hydroxide and potassium hydroxide, and sufficient water for homogeneous distribution of liquid ingredients, agitating and heating the mixture to a temperature not higher than 130° F. for a period of approximately two hours, and then drying said mixture until about a 20% loss in weight occurs.

12. A moldable plastic composition consisting of the dried reaction product of a porous cellulosic material selected from the group consisting of cellulose and cellulose-containing particles, with an aqueous mixture of formaldehyde, a member of the group consisting of a hydrocarbon which is liquid and has a low vapor pressure at the reaction temperature when the composition is cured and a mixture of such a hydrocarbon and a phenolic substance selected from the group consisting of phenol, cresol, and xylenol, and an alkali hydroxide selected from the group consisting of sodium hydroxide and potassium hydroxide, said composition being capable of hardening by heat to a substantially homogeneous hardened product.

13. A cured plastic composition consisting of the dried reaction product of a porous cellulosic material selected from the group consisting of cellulose and cellulose-containing particles, with an aqueous mixture of formaldehyde, a member of the group consisting of a hydrocarbon which is liquid and has a low vapor pressure at the reaction temperature when the composition is cured and a mixture of such a hydrocarbon and a phenolic substance selected from the group consisting of phenol, cresol, and xylenol, and an alkali hydroxide selected from the group consisting of sodium hydroxide and potassium hydroxide, said composition being hardened by the simultaneous application of heat and pressure.

14. A moldable plastic composition consisting of the dried reaction product of a porous cellulosic material selected from the group consisting of cellulose and cellulose-containing particles, with an aqueous mixture of formaldehyde, a paraffinic hydrocarbon which is liquid and has a low vapor pressure at the reaction temperature when the composition is cured and an alkali hydroxide selected from the group consisting of sodium hydroxide and potassium hydroxide, said composition being capable of hardening by heat to a substantially homogeneous hardened product.

15. A moldable plastic composition consisting of the dried reaction product of a porous cellulosic material selected from the group consisting of cellulose and cellulose-containing particles, with an aqueous mixture of formaldehyde, a paraffinic hydrocarbon which is liquid and has a low vapor pressure at the reaction temperature when the composition is cured, a phenolic substance selected from the group consisting of phenol, cresol, xylenol, and mixtures of these and an alkali hydroxide selected from the group consisting of sodium hydroxide and potassium hydroxide, said composition being capable of hardening by heat to a substantially homogeneous hardened product.

16. A cured plastic composition consisting of the dried reaction product of a porous cellulosic material selected from the group consisting of cellulose and cellulose-containing particles, with an aqueous mixture of formaldehyde, a paraffinic hydrocarbon which is liquid and has a low vapor pressure at the reaction temperature when the composition is cured and an alkali hydroxide selected from the group consisting of sodium hydroxide and potassium hydroxide, said composition being hardened by the simultaneous application of heat and pressure.

17. A cured plastic composition consisting of the dried reaction product of a porous cellulosic material selected from the group consisting of cellulose and cellulose-containing particles, with an aqueous mixture of formaldehyde, a paraffinic hydrocarbon which is liquid and has a low vapor pressure at the reaction temperature when the composition is cured, a phenolic substance selected from the group consisting of phenol, cresol, xylenol, and mixtures of these, and an alkali hydroxide selected from the group consisting of sodium hydroxide and potassium hydroxide, said composition being hardened by the simultaneous application of heat and pressure.

18. A moldable plastic composition consisting essentially of the dried reaction product of sawdust, a member of the group consisting of a hydrocarbon which is liquid and has a low vapor pressure at the reaction temperature when the composition is cured and a mixture of such a hydrocarbon and a phenolic substance selected from the group consisting of phenol, cresol, and xylenol, formaldehyde, water and an alkali selected from the group consisting of sodium hydroxide and potassium hydroxide, said composition being capable of hardening by heat.

19. A moldable plastic composition consisting essentially of the dried reaction product of sawdust, a hydrocarbon which is liquid and has a low vapor pressure at the reaction temperature when the composition is cured, an excess of formaldehyde, an alkali selected from the group consisting of sodium hydroxide and potassium hydroxide in proportion of 2% to 10% of the weight of sawdust, and sufficient water for homogeneous distribution of liquid ingredients, said composition being capable of hardening by heat.

20. A curing or molding composition comprising the dried reaction product of sawdust, a hydrocarbon of high paraffinicity boiling between 500° F. and 800° F., an excess of formaldehyde, an alkali selected from the group consisting of sodium hydroxide and potassium hydroxide in proportion of 2% to 10% of the weight of sawdust, a phenolic substance selected from the group consisting of phenol, cresol, xylenol, and mixtures of these, and sufficient water for homogeneous distribution of liquid ingredients.

21. A composition of matter consisting essentially of the dried reaction product of sawdust containing unpolymerized lignin, a member of the group consisting of a hydrocarbon which is liquid and has a low vapor pressure at the reaction temperature when the composition is cured, and a mixture of such a hydrocarbon and a phenolic substance selected from the group consisting of phenol, cresol, and xylenol, formaldehyde, water, and an alkali selected from the group consisting of sodium hydroxide and potassium hydroxide.

22. A composition of matter consisting essentially of the dried reaction product of green sawdust containing unpolymerized lignin, from about 10% to about 35% by weight of a paraffinic hydrocarbon which is liquid and has a low vapor pressure at the reaction temperature when the composition is cured, from about 8% to about 12% by weight of formaldehyde, from about 2% to about 8% by weight of an alkali selected from the group consisting of sodium hydroxide and potassium hydroxide, and sufficient water for homogeneous distribution of liquid ingredients without formation of a paste.

23. A composition of matter consisting essentially of the dried reaction product of sawdust containing unpolymerized lignin, a hydrocarbon which is liquid and has a low vapor pressure at the reaction temperature when the composition is cured, formaldehyde, water, and an alkali selected from the group consisting of sodium hydroxide and potassium hydroxide, in which the sawdust component constitutes at least 70% of the composition.

THE STAMFORD TRUST COMPANY,
*Administrator of the Estate of Emil Hene, Deceased.*
 J. G. ATKINS,
  *Vice President and Trust Officer.*

REFERENCES CITED

The following references are of record in the file of this patent:

UNITED STATES PATENTS

| Number | Name | Date |
|---|---|---|
| 1,259,472 | Baekeland | Mar. 19, 1918 |
| 2,068,926 | Nevin | Jan. 26, 1937 |
| 2,247,411 | Rostler | July 1, 1941 |

FOREIGN PATENTS

| Number | Country | Date |
|---|---|---|
| 582,853 | Great Britain | Nov. 29, 1946 |